(12) United States Patent
Hatcher et al.

(10) Patent No.: US 8,786,848 B2
(45) Date of Patent: Jul. 22, 2014

(54) INSPECTION SYSTEM FOR A COMBUSTOR OF A TURBINE ENGINE

(75) Inventors: Clifford Hatcher, Orlando, FL (US);
Forrest R. Ruhge, Orlando, FL (US);
Ian T. Doran, Charlotte, NC (US);
Robert G. Shannon, Orlando, FL (US);
Dennis H. Lemieux, Casselberry, FL (US)

(73) Assignee: Siemens Energy, Inc., Orlando, FL (US)

( * ) Notice: Subject to any disclaimer, the term of this patent is extended or adjusted under 35 U.S.C. 154(b) by 421 days.

(21) Appl. No.: 13/101,338

(22) Filed: May 5, 2011

(65) Prior Publication Data

US 2012/0281084 A1    Nov. 8, 2012

(51) Int. Cl.
*G01N 21/00* (2006.01)

(52) U.S. Cl.
USPC ........ 356/237.1; 356/241.1; 348/83; 382/152

(58) Field of Classification Search
CPC ..... F01D 21/003; F01D 25/285; F01D 9/023; F05D 2260/80; G01N 21/954; G01N 25/72; G01N 21/6447; G01N 21/8803; G01N 2203/0647; G01N 2291/2693; H04N 7/183; B64F 5/0045
USPC ............. 348/82, 83, E7.085; 901/44; 356/37, 356/241.1, 445, 237.1, 237.2; 250/559.08, 250/330; 382/151, 154
See application file for complete search history.

(56) References Cited

U.S. PATENT DOCUMENTS

| | | | |
|---|---|---|---|
| 6,009,189 A * | 12/1999 | Schaack | 382/154 |
| 6,532,840 B2 * | 3/2003 | Hatley et al. | 73/866.5 |
| 6,542,230 B1 * | 4/2003 | Luke | 356/241.1 |
| 7,057,176 B2 | 6/2006 | Rothenfusser et al. | |
| 7,121,098 B2 | 10/2006 | Hatcher | |
| 7,231,817 B2 | 6/2007 | Smed et al. | |
| 7,294,817 B2 | 11/2007 | Voigt et al. | |
| 7,489,811 B2 | 2/2009 | Brummel et al. | |
| 7,689,003 B2 | 3/2010 | Shannon et al. | |
| 7,690,840 B2 | 4/2010 | Zombo et al. | |
| 7,887,234 B2 | 2/2011 | Jonnalagadda et al. | |
| 2005/0073673 A1 | 4/2005 | Devitt et al. | |
| 2005/0199832 A1 | 9/2005 | Twerdochlib | |
| 2011/0149413 A1 * | 6/2011 | Scott et al. | 359/696 |

* cited by examiner

*Primary Examiner* — Sath V Perungavoor
*Assistant Examiner* — Nathnael Aynalem (57) ABSTRACT

An inspection system formed at least from an inspection system housing including at least one internal chamber that supports an extendible camera support shaft extending distally through a pilot nozzle port into a combustor of a gas turbine engine is disclosed. The inspection system may include a camera capable of capturing high quality images together with position coordinates. Thus, the inspection system enables images in a combustor of a gas turbine engine to be captured and recaptured at a subsequent outage so that the images may be analyzed and compared for preventive maintenance, troubleshooting, and the like. The inspection system may include three degrees of freedom for the camera mounted on the extendible camera support shaft.

19 Claims, 5 Drawing Sheets

INSPECTION SYSTEM FOR A COMBUSTOR OF A TURBINE ENGINE

FIELD OF THE INVENTION

This invention is directed generally to turbine engines, and more particularly to inspection systems for combustors in gas turbine engines.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine combustor components to these high temperatures. These turbine combustor components are inspected for damage during outages to prevent catastrophic failure.

The current standard inspection is conducted using a video scope and a highly trained technician or engineer that has the skills and dexterity to manipulate a camera into and out of a component requiring inspection. The process of inspecting a particular area of a combustor component requires pushing and twisting a flexible conduit to the area of concern and manipulating a four-way articulation system to get the desired view for the inspection. Due to the manual process of positioning the camera, capturing the same data with high repeatability is very low, if not impossible. The standard inspection is performed at a resolution of 640 H×480 V pixels with varying optics to increase or decrease magnification. The technician or engineer must be familiar with all potential discontinuities in order to ensure complete visual documentation of all critical areas. The inspection is heavily dependent on the ability and knowledge of the technician or engineer performing the inspection. The technician or engineer has to be an expert and has to be onsite for data interpretation and reporting. Thus, such system suffers from a low quality because of low repeatability.

SUMMARY OF THE INVENTION

This invention relates to an inspection system for a turbine engine for capturing images of components of a turbine engine in-situ, including, but not limited to, a combustor basket and a transition section. The inspection system may be formed from an inspection system housing including at least one internal chamber that supports an extendible camera support shaft extending distally through a pilot nozzle port into a combustor of a gas turbine engine. The inspection system may include a camera capable of capturing high quality images together with position coordinates. Thus, the inspection system may enable images of internal aspects of the combustor of the gas turbine engine to be captured and recaptured during a subsequent outage so that the images may be analyzed and compared for preventive maintenance, troubleshooting, and the like. The inspection system may include three degrees of freedom for the camera mounted on the extendible camera support shaft. As such, the inspection system enables the capture of a vast array of images within the combustor.

The inspection system may include one or more inspection system housings including at least one internal chamber. The inspection system housing may be attachable to a pilot nozzle port in a combustor of the turbine engine after a pilot nozzle and related fuel lines have been removed. One or more extendible camera support shafts may be positioned within the internal chamber extending distally from a distal opening in the inspection system housing. The extendible camera support shaft may be rotatable about a longitudinal axis of the extendible camera support shaft. The extendible camera support shaft may be extendible such that a distal end of the extendible camera support shaft may be movable longitudinally along the longitudinal axis. In one embodiment, the extendible camera support shaft may be a tube. The extendible camera support shaft may include a camera cavity, and the camera may be positioned at least partially within the camera cavity. The extendible camera support shaft may be sized to extend from the inspection system housing at the pilot nozzle port through the combustor to a distal end of a transition section extending distally from the combustor. In one embodiment, the extendible camera support shaft may be telescopic, thereby enabling the length of the extendible camera support shaft to be changed.

The inspection system may include one or more camera lenses supported by the extendible camera support shaft at a location outside of the inspection system housing that is distal of the distal opening. The camera lens may be capable of being tilted such that the camera lens may be rotatable about an axis generally orthogonal to the longitudinal axis of the at least one extendible camera support shaft. The camera lens may be in communication with a camera usable to capture high quality images. In at least one embodiment, the camera lens may be attached to the camera, and the camera may be coupled to the extendible camera support shaft. The camera lens may be, but is not limited to being, a combined automatic and manual focus lens. The camera may be a charge-coupled device (CCD) camera. The camera may be positioned at a distal end of the extendible camera support shaft.

The inspection system may include a data management system configured to coordinate detailed image information together with at least one image captured by the camera in communication with one or more camera lenses. The data management system may store images together with position coordinates and notes. The data management system may present images together with position coordinates for analysis with algorithms for calculating interval extension of specific components within the turbine engine. The data management system may correlate position coordinates with images as metadata.

The lateral extension, rotation and tilt of the camera may be controlled manually or controlled via an automated system. In at least one embodiment, the inspection system may include one or more motors in communication with the extendible camera support shaft that is configured to rotate the extendible camera support shaft. The inspection system may also include one or more motors in communication with the extendible camera support shaft that is configured to move the extendible camera support shaft longitudinally along the longitudinal axis. Additionally, the inspection system may also include one or more motors in communication with the camera lens for rotating the lens about the axis generally orthogonal to the longitudinal axis of the extendible camera support shaft. In one embodiment, the motor may be in communication with the camera for rotating the camera about the axis, thereby changing the tilt of the camera.

An advantage of the inspection system is that the inspection system is an automated visual inspection tool that can be used to inspect the operational condition of combustor components on a combustion gas turbine engine with repeatability.

Another advantage of this invention is that the inspection system enables the capture of high resolution images in a standard format that enables easy repeatability and reproducibility of the camera position and orientation.

Yet another advantage of the invention is that the inspection system enables data capture and expert review of the images from remote locations.

Another advantage of the inspection system is that the inspection system is highly repeatable, which allows complete surface documentation in automatic mode.

Still another advantage of this invention is that the inspection system provides for rapid validation; computer aided design (CAD) linkage; model based data analysis; full-field, fast, and intuitive system; programmable inspection capture; and in-frame and remote capability.

Another advantage of this invention is that the cost savings of fabrication, assembly, and integration of the system is substantial relative to conventional inspections systems.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

As shown in FIGS. 1-7, this invention is directed to an inspection system 10 for a turbine engine for capturing images of components of the turbine engine in-situ, including, but not limited to, a combustor basket 20 and a transition 54. The inspection system 10 may be formed from an inspection system housing 12 including at least one internal chamber 14 that supports an extendible camera support shaft 16 extending distally through a pilot nozzle port 18 into a combustor 20 of a gas turbine engine 22. The inspection system may include a camera 24 capable of capturing high quality images together with position coordinates. Thus, the inspection system 10 may enable images of internal aspects of the combustor 20 of the gas turbine engine 22 to be captured and recaptured during a subsequent outage so that the images may be analyzed and compared for preventive maintenance, troubleshooting, and the like. The inspection system 10 may include three degrees of freedom for the camera 24 mounted on the extendible camera support shaft 16. As such, the inspection system 10 enables the capture of a vast array of images within the combustor 20.

Figure 2:
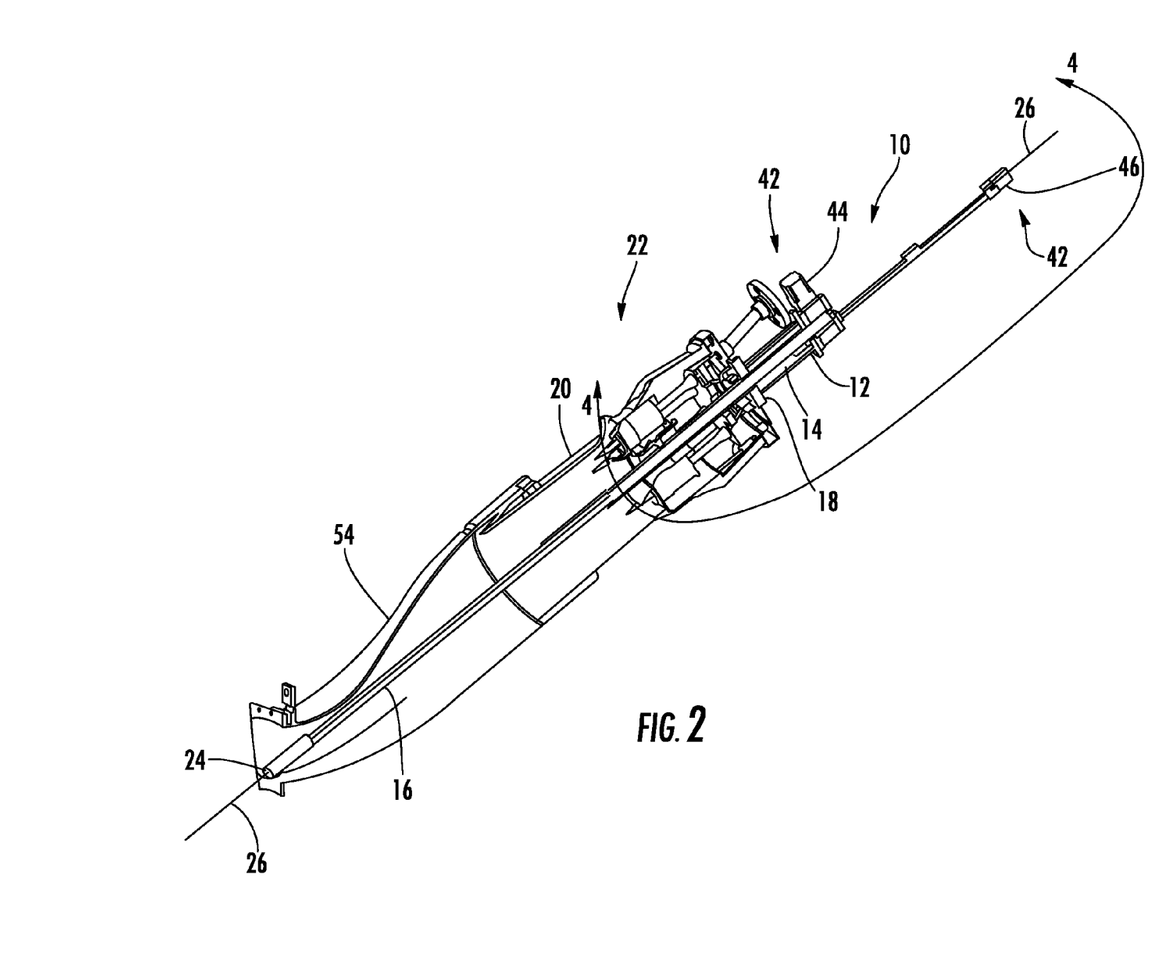
FIG. 2 is a cross-sectional perspective view of the inspection system shown in FIG. 1 taken at section line 2-2.
Figure 3:
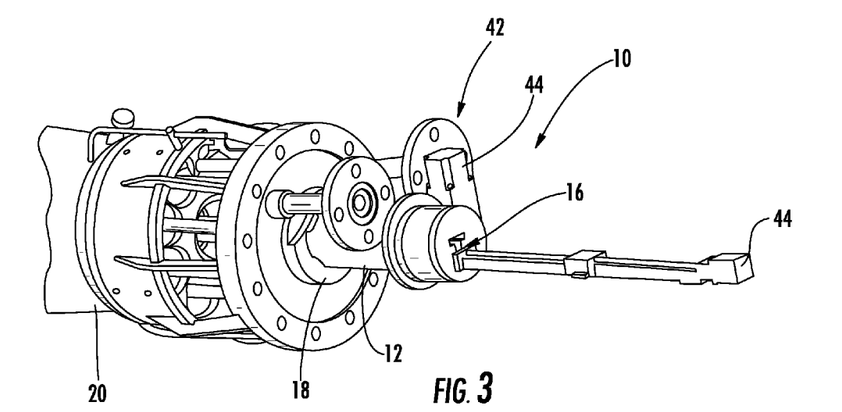
FIG. 3 is a detail view of the inspection system shown in FIG. 1 taken at detail 3-3.
Figure 5:
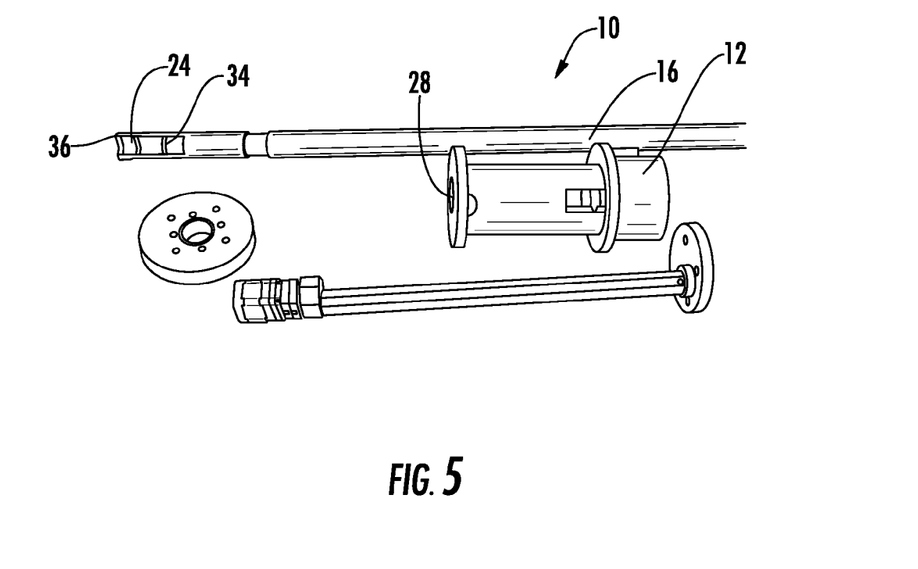
FIG. 5 is a perspective view of components forming the inspection system.

The inspection system 10 may be formed from one or more inspection system housings 12, as shown in FIGS. 2 and 5. The inspection system housing 12 may be adapted to be attached to a pilot nozzle port 18, as shown in FIG. 3, after a pilot nozzle and related fuel lines have been removed from the pilot nozzle port 18. In at least one embodiment, the inspection system housing 12 may include threads configured to mate with threads on the pilot nozzle port, thereby enabling the inspection system housing 12 to be threadably coupled to the pilot nozzle port 18. In another embodiment, the inspection system housing 12 may be coupled to the pilot nozzle port 18 via a releasably clamp or other appropriate device.

Figure 1:
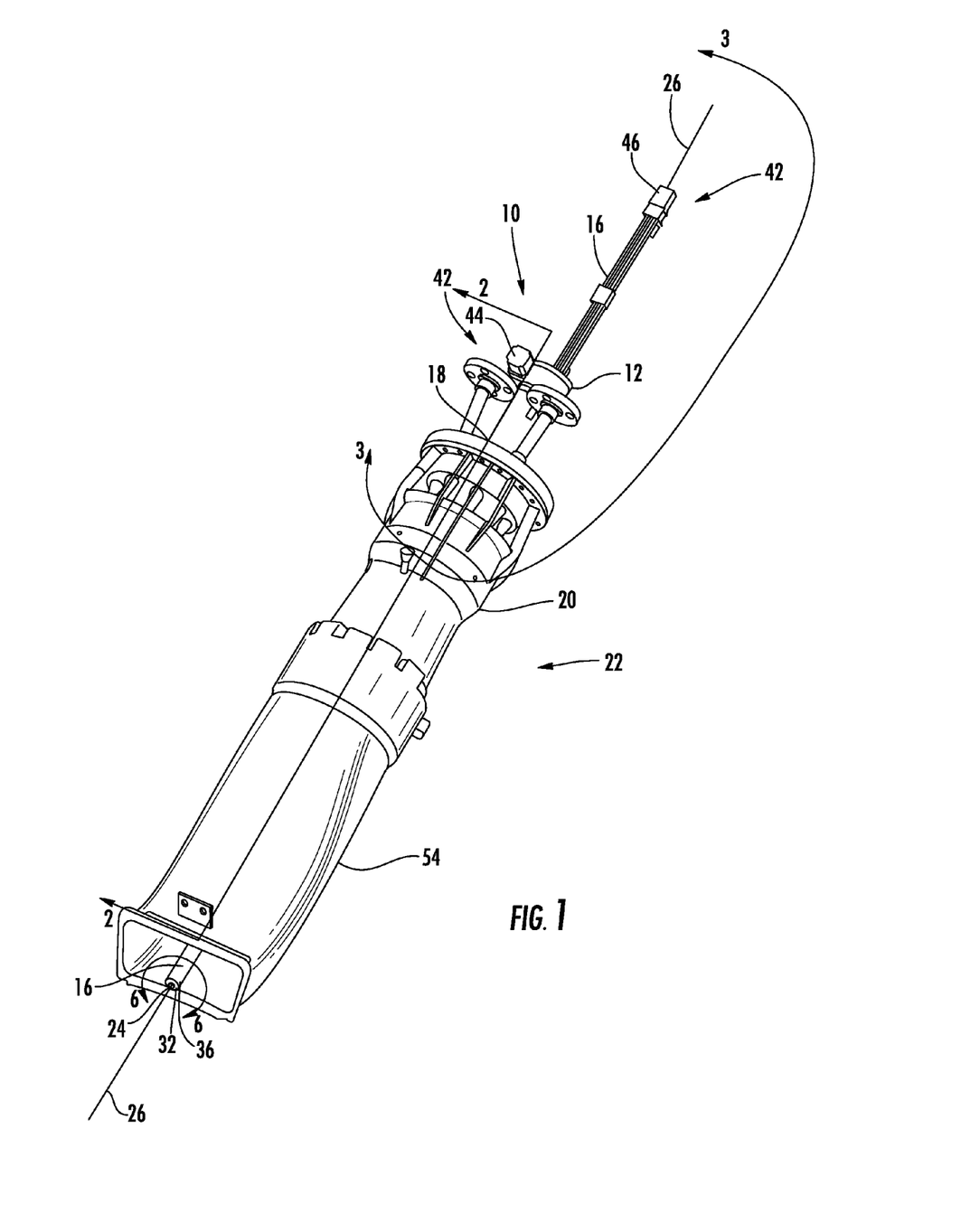
FIG. 1 is a perspective view of an inspection system attached to a pilot nozzle port and extending into a turbine combustor and transition section of a gas turbine engine.
Figure 4:
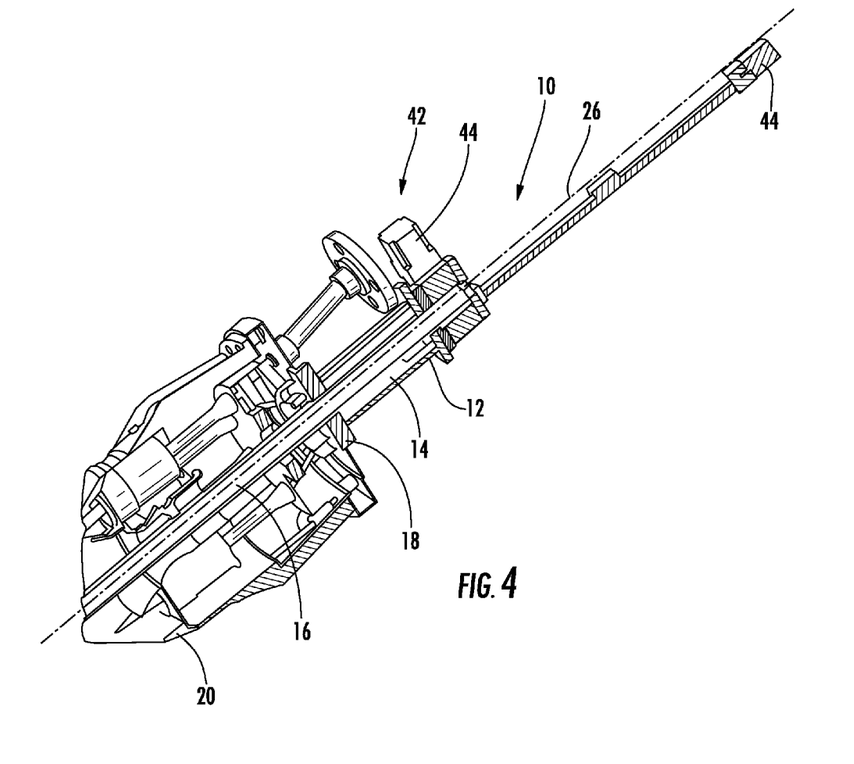
FIG. 4 is a partial cross-sectional perspective detail view of the inspection system shown in FIG. 2 at detail 4-4.

The inspection system housing 12 may include one or more internal chambers 14, as shown in FIGS. 2 and 4, configured to support the extendible camera support shaft 16. In at least one embodiment, the internal chamber 14 may have a cross-sectional shape that matches a cross-sectional shape of an outer surface of the extendible camera support shaft 16. In particular, in at least one embodiment, the internal chamber 14 may have a generally cylindrical shape, and an outer surface of the extendible camera support shaft 16 may be generally cylindrical and sized slightly smaller than the internal chamber 14 such that the extendible camera support shaft 16 fits within the internal chamber 14 without excess movement not aligned with a longitudinal axis 26 of the extendible camera support shaft 16. The extendible camera support shaft 16 may be rotatable about the longitudinal axis 26 while the extendible camera support shaft 16 is supported within the internal chamber 14 of the inspection system housing 12. The extendible camera support shaft 16 may extend distally from a distal opening 28 in the inspection system housing 12. The extendible camera support shaft 16 may be sized to extend from the inspection system housing 12 at the pilot nozzle port 18 through the combustor 20 to a distal end of a transition section 54 extending distally from the combustor 20, as shown in FIG. 1.

The extendible camera support shaft 16 may be extendible such that a distal end 36 of the extendible camera support shaft 16 is movable longitudinally about the longitudinal axis 26. In particular, in at least one embodiment, the extendible camera support shaft 16 may be telescopic, thereby enabling the length of the extendible camera support shaft 16 to be changed.

Figure 6:
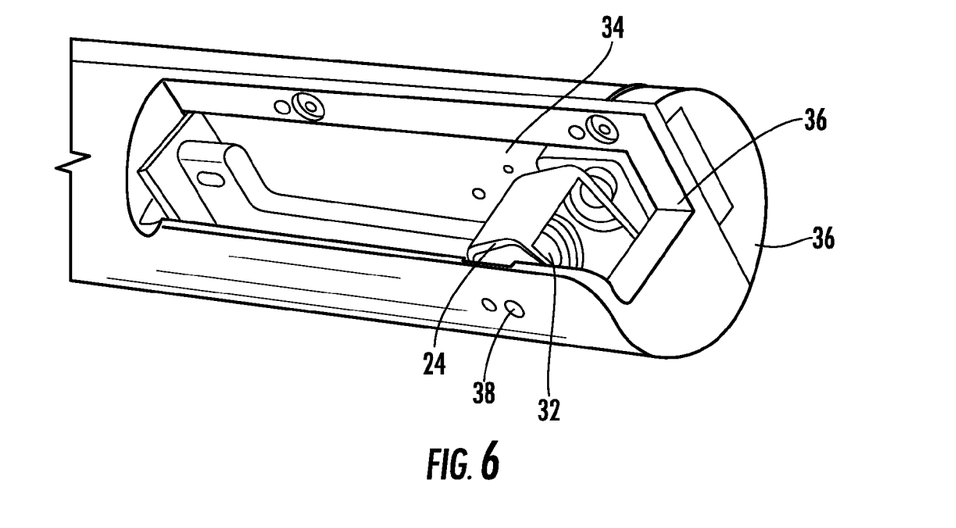
FIG. 6 is a detail view of a distal end of the extendible camera support shaft of the inspection system in FIG. 1 taken at detail 6-6.

The extendible camera support shaft 16 may support one or more camera lenses 32 at a location outside of the inspection system housing 12 that is distal to the distal opening 28, as shown in FIG. 6. The camera lens 32 may be in communication with the camera 24. In at least one embodiment, the camera lens 32 may be attached directly to the camera 24. The camera lens 32 may be rotatable about an axis 38 generally orthogonal to the longitudinal axis 26 of the extendible camera support shaft 16, thereby providing adjustable tilt. In another embodiment in which the camera lens 32 is attached to the camera 32, the camera 32 may be rotatable about the axis 38.

Figure 7:
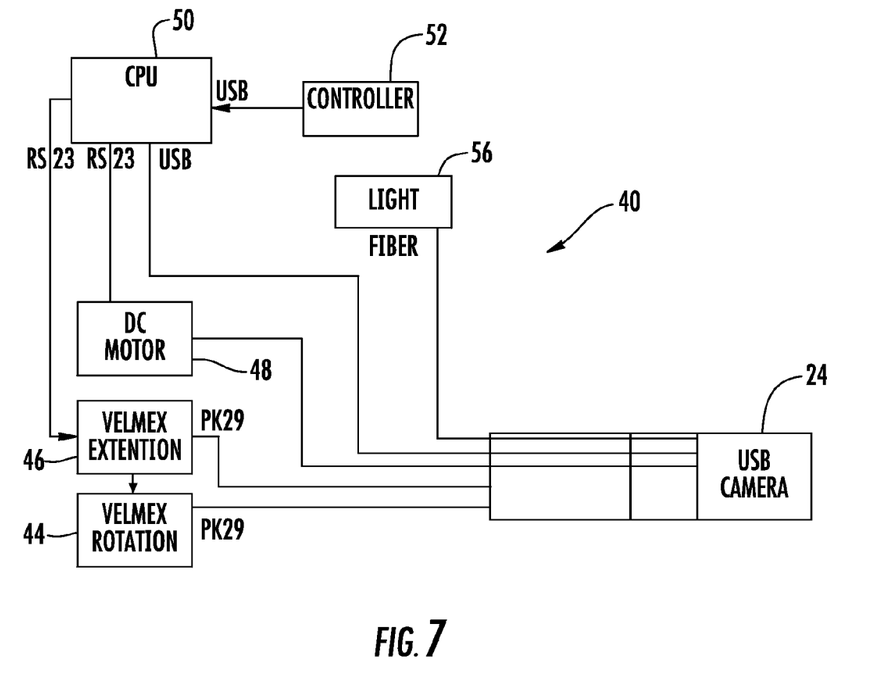
FIG. 7 is a schematic diagram of hardware components of the data management system of the inspection system.

The camera 24 may be, but is not limited to being, a charge-coupled device (CCD) camera capable of capturing high quality images. The camera may be, but is not limited to being, a camera 24 with a resolution greater than one megapixel. In one embodiment, the camera 24 may include a two megapixel sensor that delivers fluid, true-to-life video with the ability of capturing still images up to eight megapixels. The inspection system 10, as shown in FIG. 7, may include a light 56, such as, but not limited to, a 150 W quartz halogen light to increase visibility in the combustor 20, as shown in FIG. 7. The camera lens 32 may be, but is not limited to being, a combined automatic and manual focus lens. In at least one embodiment, as shown in FIG. 6, the extendible camera support shaft 16 may be formed from a tube. The extendible camera support shaft 16 may include a camera cavity 34 housing at least a portion of the camera 24. As shown in FIG. 6, the camera 24 may be contained within the camera cavity 34, thereby reducing the risk of damage to the camera 24 or camera lens 32. The camera cavity 34 may be positioned at the distal end 36 of the extendible camera support shaft 16. The camera cavity 34 may be positioned at a distal end 36 of the extendible camera support shaft 16.

The inspection system 10 may include a data management system 40, as shown in FIG. 7, configured to coordinate detailed image information together with at least one image captured by the camera 24 in communication with the camera lens 32. The data management system 40 may include a central processing unit 50 in communication with the camera 24 and a controller 52. The data management system 40 may correlate position coordinates with images as metadata. The data management system 40 may be configured to store images together with position coordinates such that the images may be captured and then recaptured one or more times during subsequent out of service periods. The pictures may then be analyzed to identify changes in the turbine combustor components that may be indicative of a problem. The inspection system 10 may capture images of liner holes cracking (below the resonators), plate fin liner outer frame weld cracking, liner thermal barrier coating (TBC) loss or erosion, upper panel exit mouth cracking, lower panel exit mouth cracking, TBC loss or erosion, inlet ring cracking and the like. The data management system 40 may also present images together with position coordinates for analysis with algorithms for calculating interval extension of specific components within the turbine engine.

The inspection system 10, including the camera 24, may be configured to operate within an environment with humidity between about 30% and 95% and an ambient operating temperature of between about 41 degrees Fahrenheit and 150 degrees Fahrenheit. The electrical components of the inspection system 10, such as the CPU 50, the camera 24 and associated hardware, may operate on 110 volts at 60 Hertz or on other appropriate power source.

The inspection system 10 may be automated such that the position of the orientation of the camera 24 and camera lens 32 may be controlled via the data management system 40 in cooperation with one or more motors 42. The location, orientation, tilt, and the like of the camera 24 may be established initially by a user, thereby enabling programmable control of three axes of motion. Alternatively, the image may be a predetermined image previously input into the data management system 40, which in turn positions the camera 24 according to position coordinates to capture the desired image. In at least one embodiment, one or more motors 44 may be in communication with the extendible camera support shaft 16 that is configured to rotate the extendible camera support shaft 16. The motor 44 may include a drive shaft in direct contact with the extendible camera support shaft 16 or may be in communication with the extendible camera support shaft 16 through one or more gears, such as, but not limited to, reduction gears. In addition, one or more motors 46 may be in communication with the at least one extendible camera support shaft 16 that is configured to move the at least one extendible camera support shaft 16 longitudinally along the longitudinal axis 26. The motor 46 may include a drive shaft in direct contact with the extendible camera support shaft 16 or may be in communication with the extendible camera support shaft 16 through one or more gears, such as, but not limited to, reduction gears. The inspection system 10 may also include one or more motors 48 in communication with the camera lens 32 for rotating the lens 32 about the axis 38 generally orthogonal to the longitudinal axis 26 of the extendible camera support shaft 16. As such, the motor 48 controls tilt of the camera 24. The motors 44, 46 and 48 may be formed from any appropriate motor such as, but not limited to, a stepper motor, such as a two-phase—⅛" step and a DC motor with an encoder. The motor 48 may include a drive shaft in direct contact with the camera lens 32 or may be in communication with the camera lens 32 through one or more gears, such as, but not limited to, reduction gears.

During use, the gas turbine engine 22 is first shutdown and the pilot nozzle and corresponding fuel lines are removed, thereby exposing the pilot nozzle port 18. The inspection system housing 12 may be attached to the pilot nozzle port 18 such that the extendible camera support shaft 16 is inserted into the pilot nozzle port 18, and the inspection system housing 12 is attached to the pilot nozzle port 18. The camera may then be positioned within the combustor 20 to inspect the operational condition of combustor components on the gas turbine engine 22. The linear extension, rotation and tilt of the camera 24 may be controlled manually, or, in another embodiment, may be controlled via one or more motors 42. As such, the motors 42 may control the linear extension, rotation and tilt of the camera 24. The data management system 40 may cause the camera 24 to capture an image. The data management system 40 may also record the position coordinates related to the position of the camera 24 when the image was recorded. The data management system 40 may also be used to include notes together with the image. This detailed data information may be recorded by the data management system 40. Once recorded, personnel, such as, but not limited to, inspectors and engineers may review the data and complete a data collection report.

Once the data has been collected, the data may be used in two ways. For instance, the data may be stored and preserved until the next outage. During the next outage, an image may be recaptured at the same location and then compared with the first image to determine whether a particular indication has gotten worse. Appropriate action may be taken at that point. The detailed data information may be used with algorithms to calculate interval extension of specific components within the combustor.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. An inspection system for a turbine engine, comprising:
    at least one inspection system housing including at least one internal chamber, wherein the at least one inspection system housing is attachable to a pilot nozzle port in a combustor of the turbine engine;
    at least one extendible camera support shaft positioned within the at least one internal chamber extending distally from a distal opening in the at least one inspection system housing, wherein the at least one inspection system housing attaches to the pilot nozzle port such that the at least one inspection system housing extends outwardly from an outer surface of the pilot nozzle port while the at least one extendible camera support shaft has a smaller outer size than the pilot nozzle port and extends through the pilot nozzle port and into the combustor of the turbine engine;
    wherein the at least one extendible camera support shaft is rotatable about a longitudinal axis of the at least one extendible camera support shaft;
    wherein the at least one extendible camera support shaft is extendible such that a distal end of the at least one extendible camera support shaft is movable longitudinally along the longitudinal axis;

at least one camera lens supported by the at least one extendible camera support shaft at a location outside of the at least one inspection system housing distal to the distal opening;

wherein the at least one camera lens is rotatable about an axis generally orthogonal to the longitudinal axis of the at least one extendible camera support shaft;

a data management system configured to coordinate detailed image information together with at least one image captured by at least one camera in communication with the at least one camera lens; and wherein the data management system stores images together with position coordinates.

2. The inspection system of claim 1, wherein the at least one camera is coupled to the at least one extendible camera support shaft and wherein the at least one camera lens is attached to the at least one camera.

3. The inspection system of claim 1, wherein the at least one camera is positioned at a distal end of the at least one extendible camera support shaft.

4. The inspection system of claim 1, wherein the at least one extendible camera support shaft is a tube.

5. The inspection system of claim 4, wherein the at least one extendible camera support shaft includes a camera cavity and wherein the at least one camera is positioned at least partially within the cavity.

6. The inspection system of claim 1, further comprising at least one motor in communication with the at least one extendible camera support shaft that is configured to rotate the at least one extendible camera support shaft for a change in rotation.

7. The inspection system of claim 1, further comprising at least one motor in communication with the at least one extendible camera support shaft that is configured to move the at least one extendible camera support shaft longitudinally along the longitudinal axis for a change in lateral position.

8. The inspection system of claim 1, further comprising at least one motor in communication with the at least one camera lens for rotating the lens about the axis generally orthogonal to the longitudinal axis of the at least one extendible camera support shaft to change tilt of the at least one camera lens.

9. The inspection system of claim 1, wherein the data management system correlates position coordinates with images as metadata.

10. The inspection system of claim 1, wherein the data management system presents images together with position coordinates for analysis with algorithms for calculating interval extension of specific components within the turbine engine.

11. The inspection system of claim 1, wherein the at least one camera lens is a combined automatic and manual focus lens.

12. The inspection system of claim 1, wherein the at least one camera is a charge-coupled device (CCD) camera.

13. The inspection system of claim 1, wherein the at least one extendible camera support shaft is sized to extend from the at least one inspection system housing at the pilot nozzle port through the combustor to a distal end of a transition section extending distally from the combustor, and wherein the at least one extendible camera support shaft is telescopic.

14. An inspection system for a turbine engine, comprising:

at least one inspection system housing including at least one internal chamber, wherein the at least one inspection system housing is attachable to a pilot nozzle port in a combustor of the turbine engine;

at least one extendible camera support shaft positioned within the at least one internal chamber extending distally from a distal opening in the at least one inspection system housing, wherein the at least one inspection system housing attaches to the pilot nozzle port such that the at least one inspection system housing extends outwardly from an outer surface of the pilot nozzle port while the at least one extendible camera support shaft has a smaller outer size than the pilot nozzle port and extends through the pilot nozzle port and into the combustor of the turbine engine;

wherein the at least one extendible camera support shaft is rotatable about a longitudinal axis of the at least one extendible camera support shaft;

wherein the at least one extendible camera support shaft is extendible such that a distal end of the at least one extendible camera support shaft is movable longitudinally along the longitudinal axis;

wherein the at least one extendible camera support shaft is sized to extend from the at least one inspection system housing at the pilot nozzle port through the combustor to a distal end of a transition section extending distally from the combustor;

at least one camera supported by the at least one extendible camera support shaft at a location outside of the at least one inspection system housing distal to the distal opening;

wherein the at least one camera is rotatable about an axis generally orthogonal to the longitudinal axis of the at least one extendible camera support shaft;

wherein the at least one extendible camera support shaft includes a camera cavity and wherein the at least one camera is positioned at least partially within the cavity;

a data management system configured to coordinate detailed image information together with at least one image captured by at least one camera; and wherein the data management system stores images together with position coordinates.

15. The inspection system of claim 14, further comprising at least one motor in communication with the at least one extendible camera support shaft that is configured to rotate the at least one extendible camera support shaft for a change in rotation, at least one motor in communication with the at least one extendible camera support shaft that is configured to move the at least one extendible camera support shaft longitudinally along the longitudinal axis for a change in lateral position, and at least one motor in communication with the at least one camera lens for rotating the lens about the axis generally orthogonal to the longitudinal axis of the at least one extendible camera support shaft for a change in tilt of the at least one camera lens.

16. The inspection system of claim 14, wherein the at least one camera is a charge-coupled device (CCD) camera with a combined automatic and manual focus lens.

17. The inspection system of claim 14, wherein the at least one camera is positioned at a distal end of the at least one extendible camera support shaft, and the at least one extendible camera support shaft is a tube.

18. The inspection system of claim 14, wherein the data management system presents images together with position coordinates for analysis with algorithms for calculating interval extension of specific components within the turbine engine.

19. An inspection system for a turbine engine, comprising:

at least one inspection system housing including at least one internal chamber, wherein the at least one inspection system housing is attachable to a pilot nozzle port in a combustor of the turbine engine;

at least one extendible camera support shaft positioned within the at least one internal chamber extending distally from a distal opening in the at least one inspection system housing, wherein the at least one inspection system housing attaches to the pilot nozzle port such that the at least one inspection system housing extends outwardly from an outer surface of the pilot nozzle port while the at least one extendible camera support shaft has a smaller outer size than the pilot nozzle port and extends through the pilot nozzle port and into the combustor of the turbine engine;

wherein the at least one extendible camera support shaft is telescopic, is rotatable about a longitudinal axis of the at least one extendible camera support shaft, is motor driven and is extendible such that a distal end of the at least one extendible camera support shaft is movable longitudinally along the longitudinal axis for a change in lateral location;

wherein the at least one extendible camera support shaft is sized to extend from the at least one inspection system housing at the pilot nozzle port through the combustor to a distal end of a transition section extending distally from the combustor;

at least one camera supported by the at least one extendible camera support shaft at a location outside of the at least one inspection system housing distal to the distal opening;

wherein the at least one camera is motor driven and rotatable about an axis generally orthogonal to the longitudinal axis of the at least one extendible camera support shaft for a change in rotation;

wherein the at least one extendible camera support shaft includes a camera cavity and wherein the at least one camera is positioned at least partially within the cavity;

at least one motor in communication with the at least one camera lens for rotating the lens about the axis generally orthogonal to the longitudinal axis of the at least one extendible camera support shaft for a change in tilt of the at least one camera lens;

a data management system configured to coordinate detailed image information together with at least one image captured by at least one camera; and wherein the data management system stores images together with position coordinates and presents images together with position coordinates for analysis with algorithms for calculating interval extension of specific components within the turbine engine.

* * * * *